United States Patent [19]
Highsmith et al.

[11] Patent Number: 6,136,115
[45] Date of Patent: Oct. 24, 2000

[54] THERMALLY-STABILIZED PRILLED AMMONIUM DINITRAMIDE PARTICLES, AND PROCESS FOR MAKING THE SAME

[75] Inventors: Thomas K. Highsmith; Corey S. McLeod, both of Ogden; Robert B. Wardle, Logan; Roger Hendrickson, Bear River City, all of Utah

[73] Assignee: Cordant Technologies Inc., Salt Lake City, Utah

[21] Appl. No.: 09/108,383

[22] Filed: Jul. 1, 1998

Related U.S. Application Data

[60] Provisional application No. 60/051,567, Jul. 2, 1997.

[51] Int. Cl.$^7$ .................................................. C06B 21/00
[52] U.S. Cl. .......................... 149/109.6; 264/3.4; 264/3.5
[58] Field of Search ........................ 149/109.6; 264/3.4, 264/3.5

[56] References Cited

U.S. PATENT DOCUMENTS

| | | |
|---|---|---|
| 2,528,407 | 10/1950 | Yeandle . |
| 2,929,106 | 3/1960 | Snow . |
| 3,388,014 | 6/1968 | Russo . |
| 4,124,663 | 11/1978 | Brumiey et al. . |
| 4,221,554 | 9/1980 | Oguchi et al. . |
| 4,736,527 | 4/1988 | Iwamoto et al. . |
| 4,764,329 | 8/1988 | Lerman . |
| 4,925,600 | 5/1990 | Hommel et al. . |
| 5,316,749 | 5/1994 | Schmitt et al. .......................... 423/385 |
| 5,324,075 | 6/1994 | Sampson . |
| 5,354,520 | 10/1994 | Oliver et al. . |
| 5,780,769 | 7/1998 | Russell et al. ............................. 149/45 |
| 5,801,453 | 9/1998 | Guimont .................................. 264/3.5 |

FOREIGN PATENT DOCUMENTS

WO/97/47571  12/1997  WIPO .

OTHER PUBLICATIONS

G.B. Manelis, Thermal Decomposition of Dinitramide Ammonium Salts, Chemical Abstracts, vol. 123, (Nov. 1995), p. 275, No. 261203k.

Derwent Publications Ltd., Powder Heat Apparatus Toner Powder Melt Particle Shape Sphere Configuration, May 1978, Section Ch, Week 7827.

*Primary Examiner*—Edward A. Miller
*Attorney, Agent, or Firm*—Pillsbury Madison & Sutro LLP

[57] ABSTRACT

A process is disclosed for producing prills comprised of ammonium dinitramide The prills can include, if desired, one or more thermal stabilizers, and processing aid(s). Solid particulate ADN is introduced into the top of a melting column, allowed to melt to form pre-prills while passing through a hot-zone ("heated zone") in the prilling column. The pre-prills are allowed to spheridize in the presence of an upwardly blown inert medium which is counter current to the path of the ADN in the prilling column. The flow is designed not to blow the ADN out of the prilling column. The rate of spheridization (prill formation) can, if desired, be accelerated by providing additional cooling, such as refrigeration, to the cooling zone in the prilling column. The ADN prills are suitable for use in propellants.

16 Claims, 8 Drawing Sheets

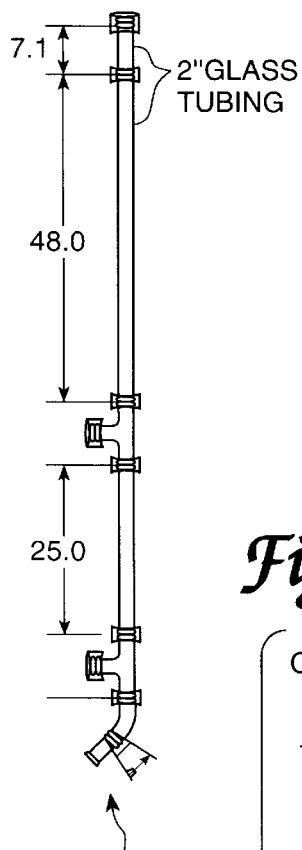
*Fig. 3*
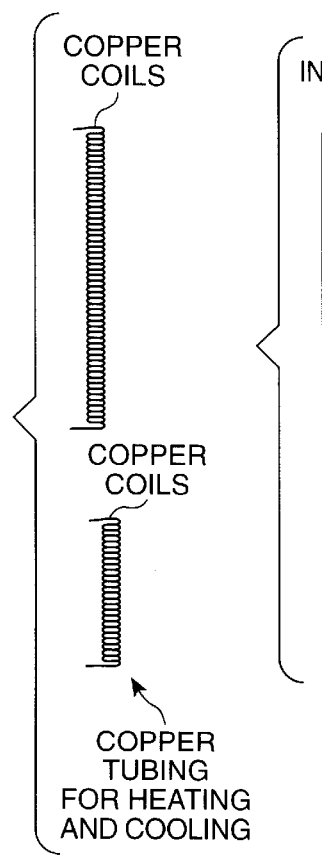
*Fig. 4* *Fig. 5*
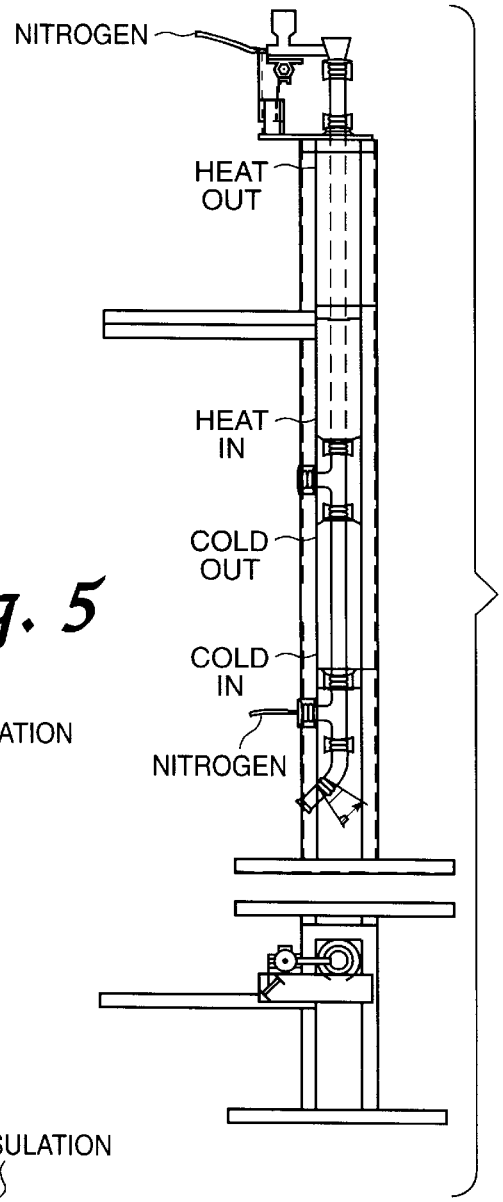
*Fig. 6*

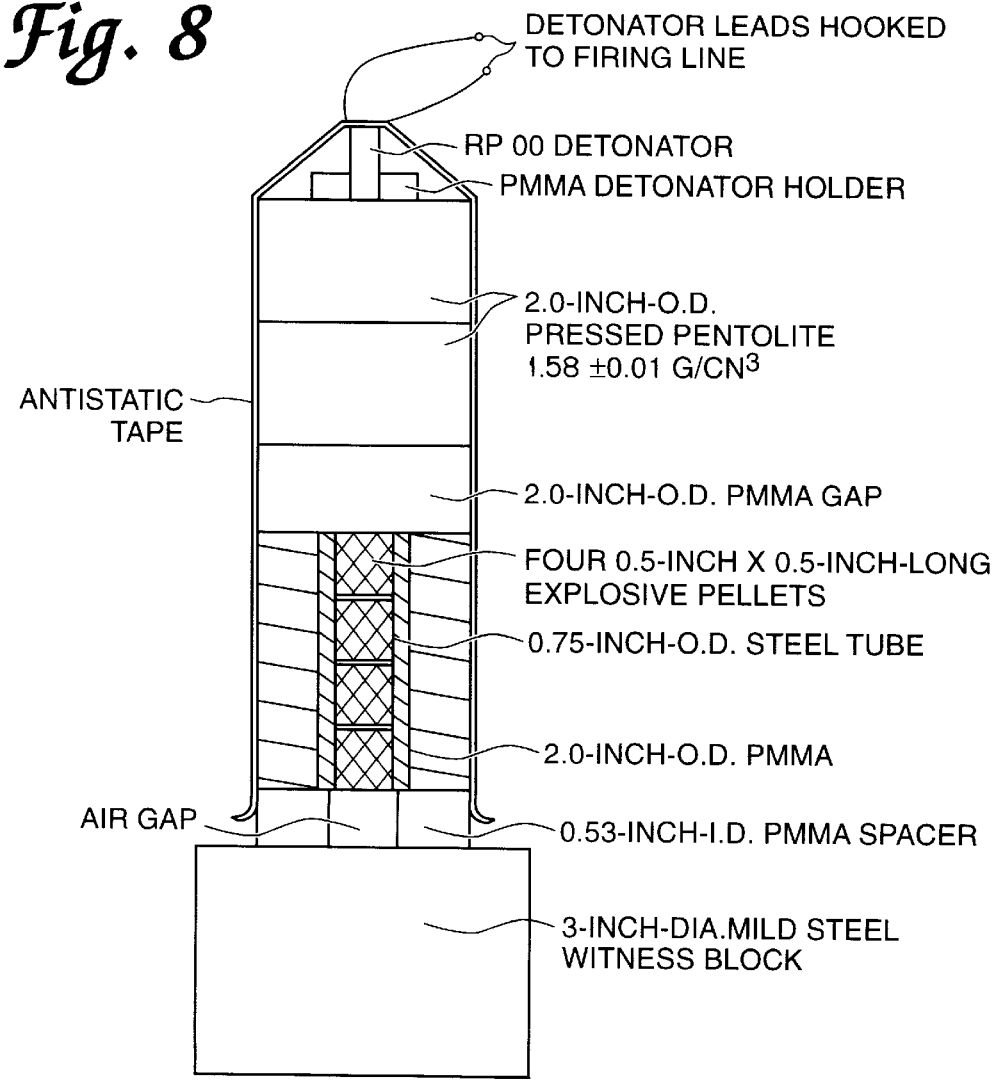

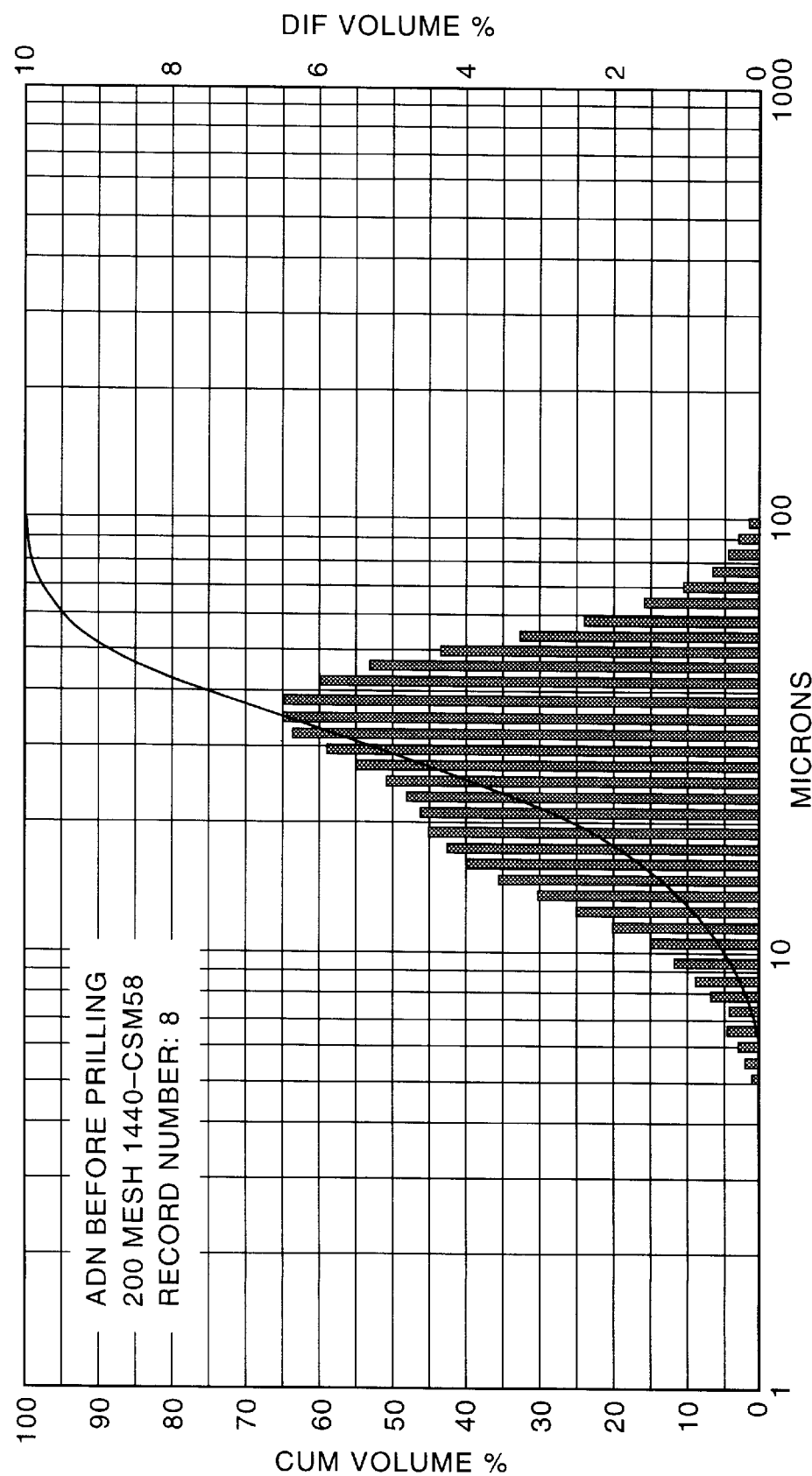

THERMALLY-STABILIZED PRILLED AMMONIUM DINITRAMIDE PARTICLES, AND PROCESS FOR MAKING THE SAME

RELATED APPLICATIONS

This is a complete application of U.S. Provisional application Ser. No. 60/051,567, filed Jul. 2, 1997, the complete disclosure of which is incorporated herein by reference.

U.S. GOVERNMENT CONTRACTS

The invention was made with Government support under Contract No. 0174-95-C-0078 awarded by the Department of the Navy, the U.S. Government may have certain rights in the invention.

BACKGROUND OF THE INVENTION

1. Field of the Invention

The present invention is directed to an ambient feed spheridization process for producing prills of ammonium dinitramide ("ADN"). More particularly, the present process produces at least essentially solid spherically-shaped particles ("prills") of thermally-stabilized ammonium dinitramide, with the capability of tailoring the relative modality, e.g., particle size distribution, of the prills. The present invention further relates to the prilled particles, and energetic formulations containing the prills, such as, for example, solid propellants and explosives.

2. Description of the Related Art

Ammonium dinitramide offers the promise of desirable oxidizer properties, including relatively high density, high oxygen content, and an acceptable heat of formation, while avoiding the environmental hazards associated with halogen-containing, and in particular chlorine-containing, oxidizers.

Unfortunately, the promise of this relatively new oxidizer has not been fully realized, since ADN also suffers from deleterious attributes, including hygroscopicity, poor morphology (planks), and low thermal stability. With regard to this last attribute, ADN is markedly less thermally stable than ammonium nitrate, which is a well known and commonly used oxidizer. Indeed, the initial onset of ADN decomposition to ammonium nitrate and $N_2O$ can be observed at as relatively a low temperature as approximately 90–92° C.

Over the last several years, efforts have focused on methods of preparing ADN and the use of ADN in propellant formulations and other formulations. These recent processes include those disclosed in U.S. Pat. No. 5,198,204, U.S. Pat. No. 5,415,852, and U.S. Pat. No. 5,316,749, the complete disclosures of which are incorporated herein by reference.

Despite the advancements provided by the processes disclosed in these patents, there remains a need for a commercially practical process for producing ADN prills which minimizes or eliminates the detrimental attributes of the oxidizer.

SUMMARY AND OBJECTS OF THE INVENTION

It is therefore an object of the present invention to overcome the above-mentioned problems and address the above-mentioned art-recognized needs by providing a prilling process for forming prilled particles containing ADN as the principle component, in which the thermal instability of ADN, as a neat ingredient, and as an oxidizer in propellant formulations, is reduced, if not eliminated.

In addition to the advantageous properties exhibited by the resultant ADN prills, the present process further offers the manufacturing advantage of being able to produce ADN in different grades, i.e., different particle sizes. This manufacturing advantage facilitates the effective use of a selected grade of ADN in the formulation of propellants. That is, the present process yields ADN products with improved morphology, including significantly and unexpectedly high uniformity based on a tailorable particle size distribution basis, with the consequent desirable benefit of vastly improved safety in comparison to conventionally produced ADN. A further related advantage is producing a prilled product (spherically shaped) which, in principle, is less detonable than conventionally produced ADN.

The present process produces an ADN product exhibiting enhanced processability and a higher bulk density. Markedly lower mix viscosity, improved homogeneity of resultant products (prills and propellants containing prills), few voids in prills, and enhanced resistance to humidity are among the additional advantages of the present invention. Higher bulk density and few voids in prills may be related. Resistance to humidity simplifies and may, in some applications, eliminate special handling of ingredients and of propellants containing the present ADN-pills.

High prilling efficiencies are also an object of the present invention. Prilling efficiencies of 99% or more are obtainable.

The present process also makes it possible to obtain ADN-prills which have an apparent bulk density which may be approximately comparable to the theoretical ADN crystal density, and in general, the bulk density can be readily at least about 98–99% of the ADN crystal density.

It is another object of the present invention to provide prilled ADN particles, and especially spheroidally-shaped prilled ADN particles, suitable for use in formulating solid propellant compositions. The present invention therefore further encompasses propellant formulations incorporating the present prilled ADN particles.

These and other objects, features, and advantages of the present invention will become more apparent from the following detailed description of the invention when taken in conjunction with the accompanying drawings which illustrate, by way of example, the principles of the present invention.

BRIEF DESCRIPTION OF THE DRAWINGS

The accompanying drawings illustrate the present invention. In such drawings:

FIG. 3 is a cross-sectional view of a prilling tube (ADN-prilling column) according to the present invention.

FIG. 4 shows heating and cooling coils for the heated and cold zones, respectively, suitable for use with the ADN-prilling column of FIG. 3.

FIG. 5 shows the insulation jackets suitable for use in combination with the ADN-prilling apparatus (column) of FIG. 3.

FIG. 6 shows, in partial cut-away, an embodiment of the ADN-prilling apparatus of the present invention.

FIG. 7A and FIG. 7B respectively show the relative distribution of the feedstock and the approximate maximum feedstock particle size in an illustrative prilled product. The distribution can be narrowed about the maximum.

FIG. 8 shows how card gap testing can be performed.

FIGS. 9A and 9B show the particle size distribution before and after prilling according to Example 2.

DETAILED DESCRIPTION OF THE INVENTION

Figure 1:
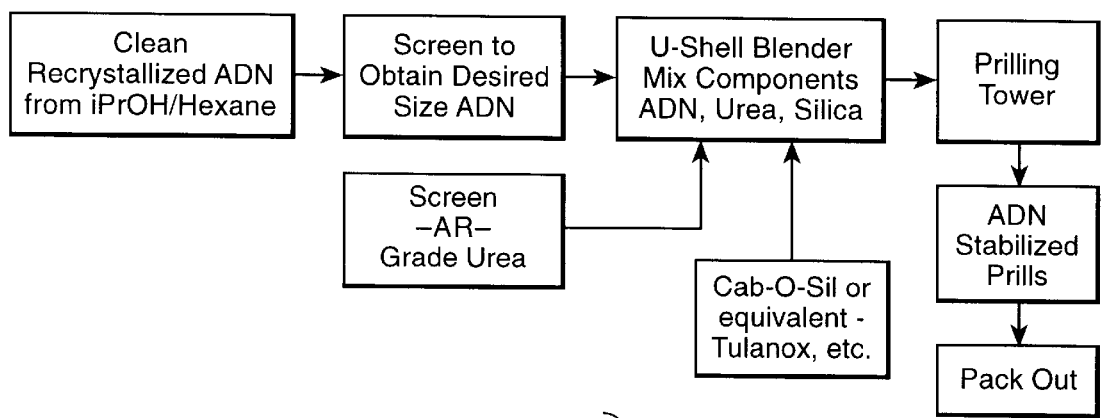
FIG. 1 depicts a flow diagram of which illustrates aspects of the process embodiment of the present invention.

Referring now more particularly to the drawings, there is shown in FIG. 1 a schematic flow diagram of a prilling process employable in connection with an embodiment of the present invention.

In one embodiment, feedstock for preparing ADN is introduced into a feeder, such as a hopper or comparable device. The hopper can be loaded with the selected amount of ADN, but it is preferable that the ADN be in a selected relatively fine particulate form. It is preferred that the ADN not be compacted in the hopper. Hence, it is preferred that the depth of the ADN bed which can form in the hopper be limited. Other feeder devices, such as screw feeders or the like, can be used.

The morphology of the ADN feedstock can, if desired, be selected to reduce variations in process parameters which may affect prill sizes and distribution. The ADN-containing feedstock is preferably dry or at least essentially dry. Moisture is not desired.

The ADN for the prilling feedstock can be prepared by crystallization to a desired particle size. Suitable methods include crystallization using isopropanol/hexane (FIG. 1). The shape of the individual ADN or ADN-containing particles in the prilling feedstock is not critical. The total volume of the ADN crystals will be reflected in the ADN prilled product. Accordingly, even ADN crystals with a high aspect ratio (length/width) can be used as the prilling feedstock.

In order to ensure that the ADN feedstock satisfies any particle size distribution requirements, the feedstock can optionally be pre-screened prior to being introduced into the feeder. Generally, the ADN feedstock can have a peak particle size in a range of from about 20 $\mu$m to about 300 $\mu$m. Preferably the ADN feedstock has a particle size in a range of up to about 40 $\mu$m, although for preparing other prill grades larger sized ADN feedstock can be used, such as ADN particles up to about 180 $\mu$m. The size distribution of the resultant ADN-prills may be directly influenced by feed size. Hence, the relative maximum peak particle in the feedstock, and the distribution about that selected maximum peak particle size, can be used to control the relative peak particle size and distribution about the maximum peak prill size in the resultant ADN prilled products. For instance, as depicted in FIG. 7A and FIG. 7B, the relative peak particle size distribution of the feedstock (FIG. 7A) can be narrowed about the approximate maximum peak particle size in the prilled product (FIG. 7B). Thus, the latter peak particle size is about the same in the feedstock, but with a narrower distribution.

By preference, the ADN added to the hopper contains at least one selected thermal stabilizer, such as a nitrogen-containing organic stabilizer, of which urea and/or a mono- and/or a poly-hydrocarbon urea derivative, such as 1,1-dialkylurea arid/or 1,3-dialkylurea, are exemplary.

By preference, in the hydrocarbon-containing urea derivatives, the hydrocarbon groups contain 1 to 10 carbon atoms, more preferably 1 to 6 carbon atoms, and can be straight chain, branched or cyclic (including aryl). When a urea derivative contains more than one hydrocarbon group, each group can be the same or different from the other group(s). Thus, with the poly-alkyl-substituted urea stabilizers, each alkyl group can be the same or different. Suitable alkyl groups can be selected independent from one another, and include, among others, methyl, ethyl, n-propyl, i-propyl, n-butyl, i-butyl, t-butyl, pentyl, cyclopentyl, hexyl, cyclohexyl, octyl, nonyl and decyl. Suitable aryl groups include phenyl, among others. Thus, for instance, 1,1-dimethyl urea, 1,3-dimethyl urea and N,N'-diethyl and N,N'-diphenyl urea can be used.

The concentration of selected thermal stabilizer, e.g., a nitrogen-containing stabilizer such as urea, in the prilled ADN particle can be controlled via the amount of stabilizer introduced in the formulation of the feed stock. For example, the thermal stabilizer can be used in a range of from about 0.1% to about 5% by weight, preferably in a range of from about 0.25% to about 2% by weight, and more preferably in a range of from about 0.5% to about 1.25% by weight (of feedstock or of the prill weight).

In one embodiment, the selected stabilizer can be added with a suitable solvent to the ADN during a purification or crystallization step prior to introducing the feedstock into the feeding device, e.g., hopper or the like. Suitable such solvents include $CH_3CN$, ether, MTBE, ethyl acetate, heptane (n-heptane or a mixture of any heptanes), hexane (n-heane, cyclohexane, or a mixture of any hexanes), alkanols (such as methyl alcohol, ethyl alcohol, i-propyl or n-propyl alcohol, butyl alcohol (t-butyl, n-butyl or i-butyl alcohol) or any thereof) and a mixture of any such suitable solvents.

The unexpected improvements seen with the stabilizer-containing feedstock can be demonstrated by simulated bulk auto ignition testing ("SBAT"), which consists of a procedure in which a 0.5 gram sample in a test tube is placed in a heated block. The heat rate of the block was 24° F./hour for ramped experiments to a selected temperature ceiling, such as 500° F. The isothermal data were obtained using the sample in the heated block with a test tube. A thermocouple is positioned within the sample. The thermal events, and in particular the onset of decomposition, for the samples were monitored as a function of time. SBAT data can be used to benchmark the ADN-feed in the heating zone. Listed below in Table I are the results of a SBAT testing performed on ADN feed including designated amounts of urea.

TABLE I

| SBAT | Urea (wt. %) | Result |
| --- | --- | --- |
| Temperature ramp 24° F./hr | 0.00 | Onset 210° F. |
| Temperature ramp 24° F./hr | 0.25 | Onset 253° F. |
| Temperature ramp 24° F./hr | 0.50 | Onset 242° F. |
| Temperature ramp 24° F./hr | 1.00 | Onset 250° F. |
| Temperature ramp 24° F./hr | 2.00 | Onset 260° F. |
| Isothermal at 90° C. | 1.00 | No reaction and no Burn 48 hrs. |
| Isothermal at 120° C. | 1.00 | Small exotherm @ 11 hrs (<7° F. |
| Isothermal at 100° C. | 0.5 | No reaction 48 hrs |
| Isothermal at 120° C. | 0.00 | Immediate reaction |

The samples from which the above-presented data were obtained were prepared by mixing the ADN with urea stabilizer. No special apparatus is required for this mixing.

Agglomeration in the feeding apparatus is undesired. Therefore, one or more additives, such as those disclosed hereinbelow and others, can be added to avoid agglomeration and to impart other beneficial characteristics to the final prilled product. Thus, the ADN added to the hopper preferably also contains a processing aid, such as a finely divided silica-type product. The silica-type product is mixed into the ADN to obtain a blend which, by present preference, is an essentially homogeneous blend. By preference the ADN, thermal stabilizer and additive, such as a processing aid, are mixed in a relatively short, but sufficient, time to achieve a desired homogeneity. In general, mixing times on the order of minutes, such as 1–2 minutes, have proven satisfactory in the preparation of feedstock for producing modest-sized lots of ADN prills. Excessively long mixing times are not presently preferred.

V-shell type blenders can be used to effect this mixing for small lot sizes, and can also be used to layer (kilogram) lot sizes. In addition, static mixers can, if desired, be used to achieve solid—solid mixing of ADN, thermal stabilizer and other additives (such as the processing aid).

Examples of finely divided silica, such as fumed silica include, without limitation, commercially available fumed silica, such as Tulanox or Cab-O-Sil brand fumed silica. The fumed silica can have different surface areas per unit weight. For instance, the Cab-O-Sil brand grades of fumed silica include the TS-720 (100 $m^2/g$), TS-610 (120 $m^2/g$) and TS-530 (200 $m^2/g$) grades and untreated grades, such as, L-90 (100 $m^2/g$), LM-130, LM-150, M-5 (PTG M-7D) (200 $m^2/g$), MS-55 (255 $m^2/g$), H-5 (300 $m^2/g$), HS-5 (325 $m^2/g$) and TH-5 (380 $m^2/g$). Although not particularly limited, the surface area of a suitable fumed silica type product can be from about 100 $m^2/gram$ to about 400 $m^2/gram$. In addition, some metal oxides, such as ZnO or MgO, can be used as processing aids. It is, however, desirable to have the processing aid well-dispersed in the ADN-feedstock before forming the ADN pre-prills.

The amount of processing aid can vary, but in general an amount which is capable of maintaining the mixture unconsolidated and free-flowing can be used in formulating the ADN feedstock. Processing aids can be used alone or in combination. A small but effective amount of the selected processing aid, such as an amount sufficient to preventing caking (agglomeration etc.), is preferred. Such amounts can generally be in a range of about 0.25 wt. % to about 5 wt. %, but smaller amounts in the range of about 0.5 wt. % to about 1.5 wt. % based on the weight of the ADN in the feedstock can also be used.

A small but effective amount of a processing aid can also serve to protect the ADN feed from caking or deliquescence at a high humidity, such as 70% relative humidity (Rh). For instance, incorporating about 1.0 wt. % Cab-O-Sil in the ADN-feed stock enabled the crystalline ADN to remain a free-flowing solid even after 200 hours at 70% Rh. The treated ADN-feedstock can re-equilibrate to initial weight under reduced humidity conditions.

Satisfactory ADN prills have been obtained using feedstock to which was added 0.5 wt. % of a fumed silica (such as a Cab-O-Sil brand silica) and 0.5 wt. % of stabilizer (such as urea).

By preference, in one embodiment, the ADN feedstock is well-mixed in the feeder. Alternatively or in addition thereto, a separately prepared ADN feedstock, including stabilizer and additive(s), can introduced into the feeder.

The present process is advantageously conducted while avoiding the conventional reservoir of fertilizer melt as commonly used in fertilizer prilling processes. Rather, the solid ADN feedstock from the hopper in FIG. 6 is introduced into the ADN-prilling column and melted. By preference, the ADN melt is formed in the column as the particles fall through the heated or hot zone of the prilling column by force of gravity while being counter current to an inert fluid media which is blown into the bottom of the prilling column. For small lot sizes, such as less than a kilogram, the ADN feedstock can be fed to the present prilling column at about 1–5 grams/minute. Higher feed rates can be achieved. However, regardless of the feed rate, it is desirable to have unconsolidated particles. For instance, with larger particles and faster feed rates so-called prilling plates can be installed, if desired, at the top of the prilling column before the hot z one so that the particles are not consolidated. While in the hopper, the feedstock is preferably at an ambient temperature which is less than about 40° C. to avoid agglomeration and reduce the potential for degradation.

In the present process the elapsed time in which the ADN is at an elevated temperature is relatively short, and can be a matter of seconds or even milliseconds. The residence time at an elevated temperature can be as short as 10 seconds, generally less than about 5 seconds, and preferably less than about 2 seconds, or even milli seconds (100–500 milli seconds). The shorter residence times on the order of milli seconds are quite suitable for small scale lot productions. Scale-up to larger scale apparatus may entail a somewhat longer residence time at melt temperature (pre-prill formation in the hot zone), but the residence time is nonetheless shorter than commonly encountered in conventional ammonium nitrate prilling using melts and spray heads. The residence time within the hot zone (at elevated temperature) is generally only sufficient to form pre-prills by melting the solid particulate ADN feedstock into droplets ("pre-prills"). Extended residence time at elevated temperature is not desired. The temperature in the hot zone can be 90° C.–150° C., preferably 100 to 130° C. Good products have been obtained using a hot zone having a temperature of about 125° C.

In the present process, an inert fluid is drawn through the prilling column in upward, countercurrent flow with respect to the falling ADN-containing droplets (pre-prills). The inert fluid medium can comprise at least one inert gas, including by example and without limitation, noble gases, such as argon, helium, katon, neon, nitrogen and $N_2O$. In principle, dry air can be used.

The fluid media can be introduced in a lower section of the prilling column, and preferably at a selected position below the inlet for a cooling zone as shown in FIG. 6. Although not required, ADN fines or other debris that become entrained in the upward fluid flow can, if desired, be subsequently removed with filters or other particle separators (not shown). The filtered fluid media can be recycled for further use. Likewise, the filtered ADN fines can be recycled to prepare feedstock and thereby improve the efficiency of the overall process.

The fluid media can be introduced at a selectable pressure or within a selectable pressure range. The selected pressure is generally sufficiently low to avoid creating excessive turbulent upward flow of the fluid media. Such excessive turbulence can cause ADN prills forming in the prilling column to collide with each other or impact the interior surfaces of the prilling column, which can adversely affect the morphology of the resulting prills. On the other hand, in general the pressure should be sufficient to ensure spheridization (prill formation) while avoiding excessive turbulence in the AND prilling column. The fluid media can also function to transfer heat, e.g., function as a thermal conductor, and can serve to exclude moisture from the prilling environment. The fluid media is preferably dry. Pressures in the order of about 1 to about 2 atmospheres have proven satisfactory in small scale production.

The present process can, if desired, include a so-called cooling or cold zone for freezing out, e.g., solidifying, the melted ADN droplets falling through the prilling column to accelerate the solidification of the ADN droplets (pre-prills) to prills. In FIG. 6, the cold zone is generally designated with reference to the section of the column having the cooling means (cooling jackets, cooling coils etc.). Residence time within the cold zone can, if desired, be on the order of from about milli seconds to about 10 seconds, with the duration of the residence time in the cooling zone being largely a function of the equipment used. Longer times are generally limited by the size of the equipment. ADN prills have been obtained using prilling apparatus in which the estimated duration of the cooling was approximately half that of the estimated duration in the hot zone. For small batches, 150 milli seconds at melt temperature in the hot zone and approximately 75 milli seconds in the cold zone have been used.

The hot and cold sections of an ADN prilling apparatus can therefore be designed to permit the duration of the ADN exposure to the selected temperatures. In one embodiment, the top-to bottom length of the cold zone can be approximately 50% of the length of the hot zone. In that embodiment, the residence time of the particles (pre-prills or prills) in the cold zone is less than 50% of the residence time within the hot zone simply because the rate at which the particles fall through the prilling column will increase due to gravity. Therefore, by taking into account the effects of gravity and the fluid media flow, a prilling column can be provided which has the desired relative residence times in the hot and cold zones respectively.

In general, the cold zone can be at a temperature in a range which is sufficient to form hard prills, while avoiding excessive condensation, such as from about from sub-zero° C. to below the melting point of ADN. A relatively warmer cooling temperature can be used to effect a slower freezing/prilling. At present, the critical factor is a cooling temperature below the melting point of ADN. A suitable upper temperature can be up to about 40° C., preferably up to about 25° C. A suitable preferred temperature range can be from about −15° C. to about 0° C. for a prilling system as shown in FIGS. 2–6. A suitable target temperature range for the cold zone can be readily established and maintained for a particular column. It is desired to avoid condensation within the prilling column. In an embodiment as shown in FIG. 6, a cooling coil (FIG. 4) wrapped around the periphery of a section the prilling chamber can be used to establish the "cold zone". A selected cooling medium can be circulated within the cooling coil.

The temperature in the respective hot and cold zones can be regulated by controlling the respective rates and temperature of the heating and cooling media and the recirculation unit. The fluid media in the column itself can also be monitored, and checked, as appropriate, and controlled based, for instance, on output from a thermocouple in the gas flow within the column (prill tower).

The prilling column can be thermally insulated to improve the energy efficiency of the column.

The prilling column height, and thus the falling distance, the velocity of the inert cooling fluid, and, if used, the temperature of the hot and cooling zones are adjusted so that the ADN prills are sufficiently hard, e.g., robust, when they strike the surface of the prill collector. Generally, when viewed in reference to this disclosure, the selection of these and other parameters relating to the configuration and size of the prilling column and components thereof would be apparent and obtainable to the skilled artisan without undue experimentation.

Figure 2:
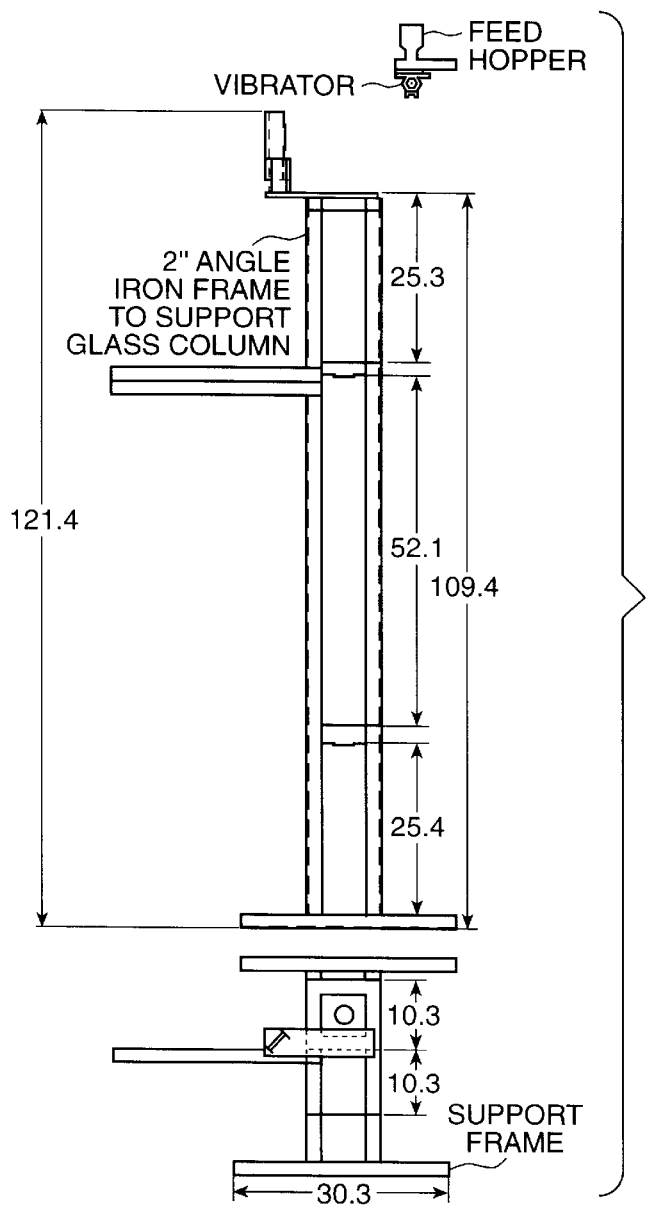
FIG. 2 is a cross-sectional view of a frame for an ADN prilling apparatus according to an embodiment of the present invention.
Figure 9B:
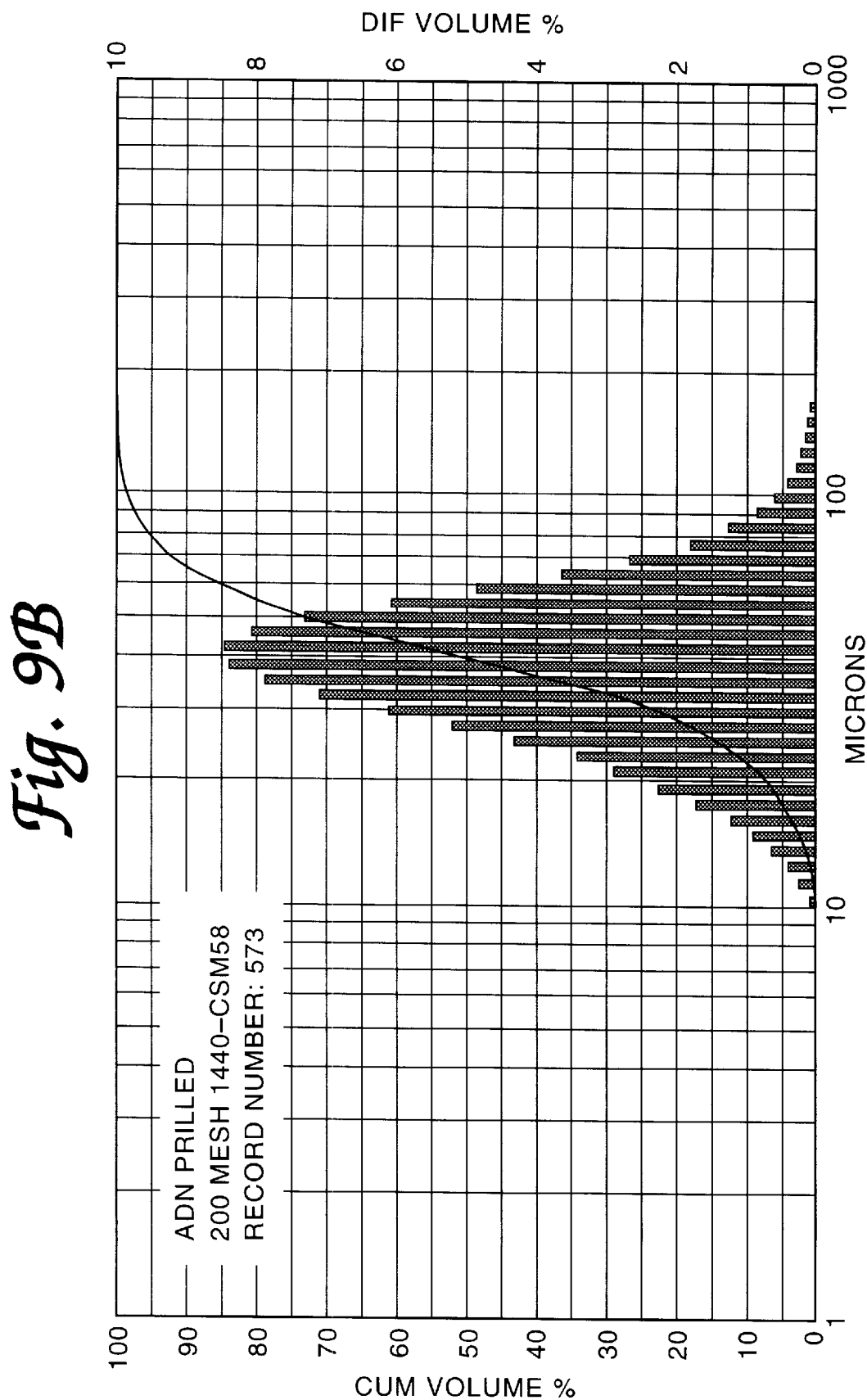
Figure 10A:
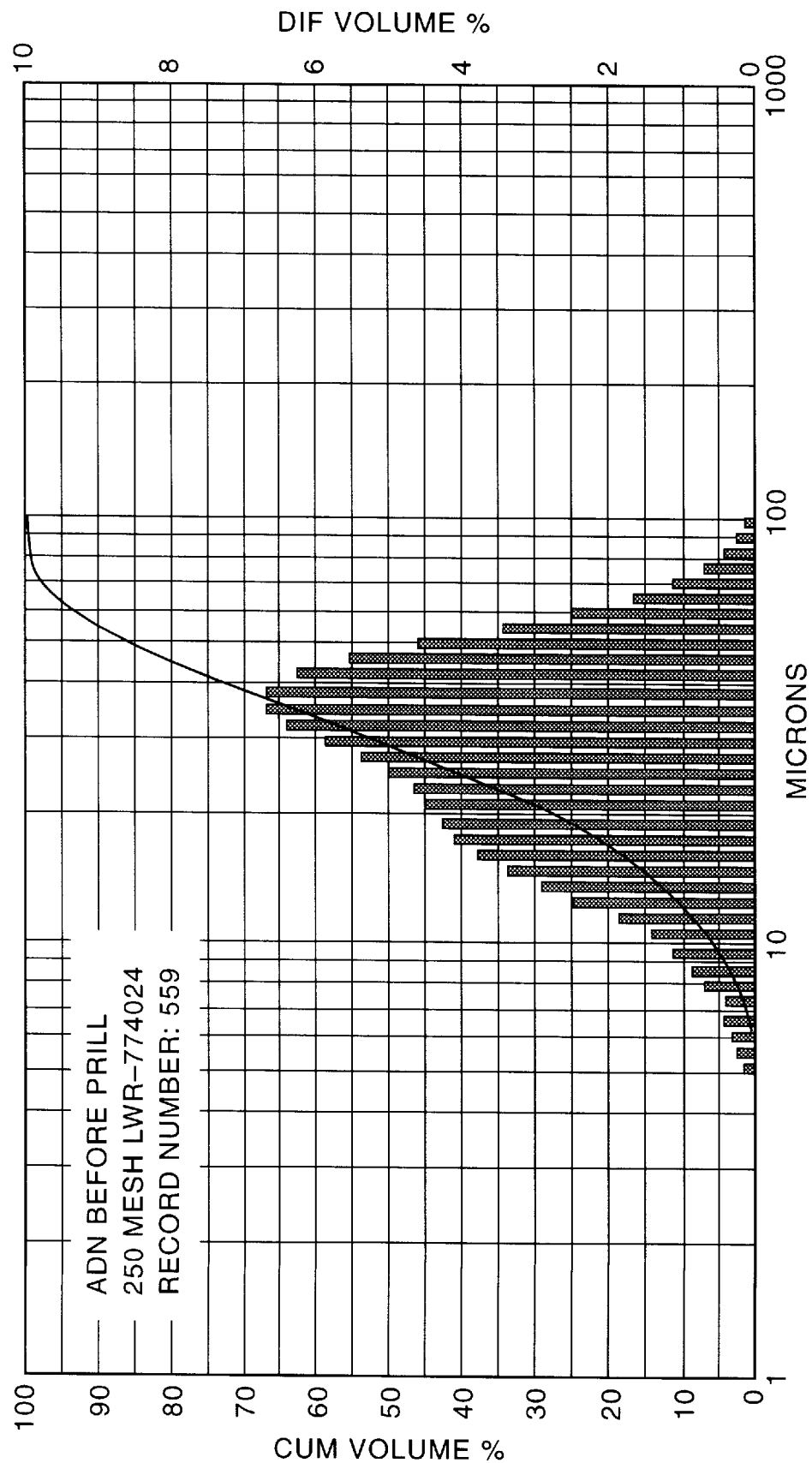
FIGS. 10A and 10B show the particle size distribution before and after prilling according to Example 3.
Figure 10B:
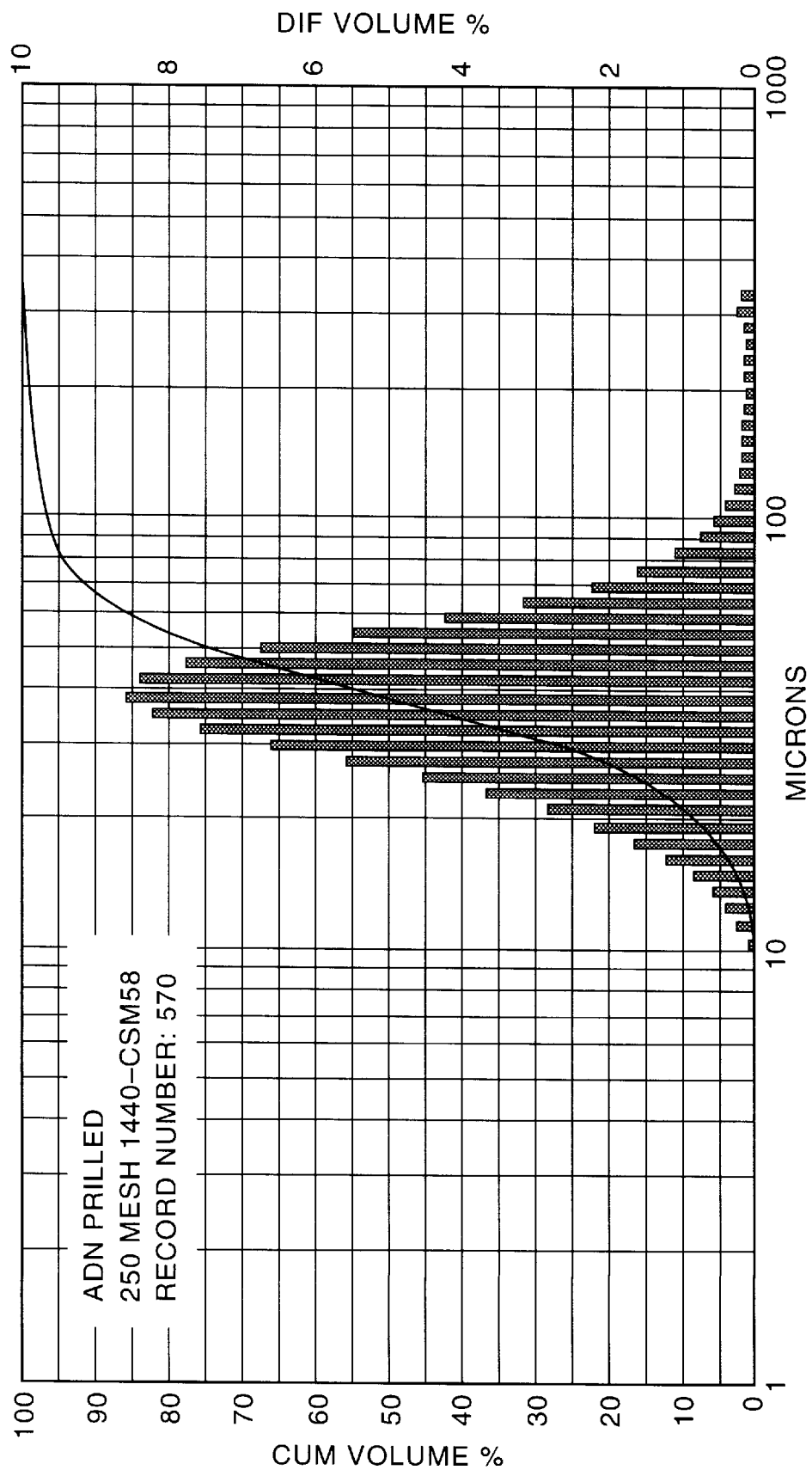
Figure 11:
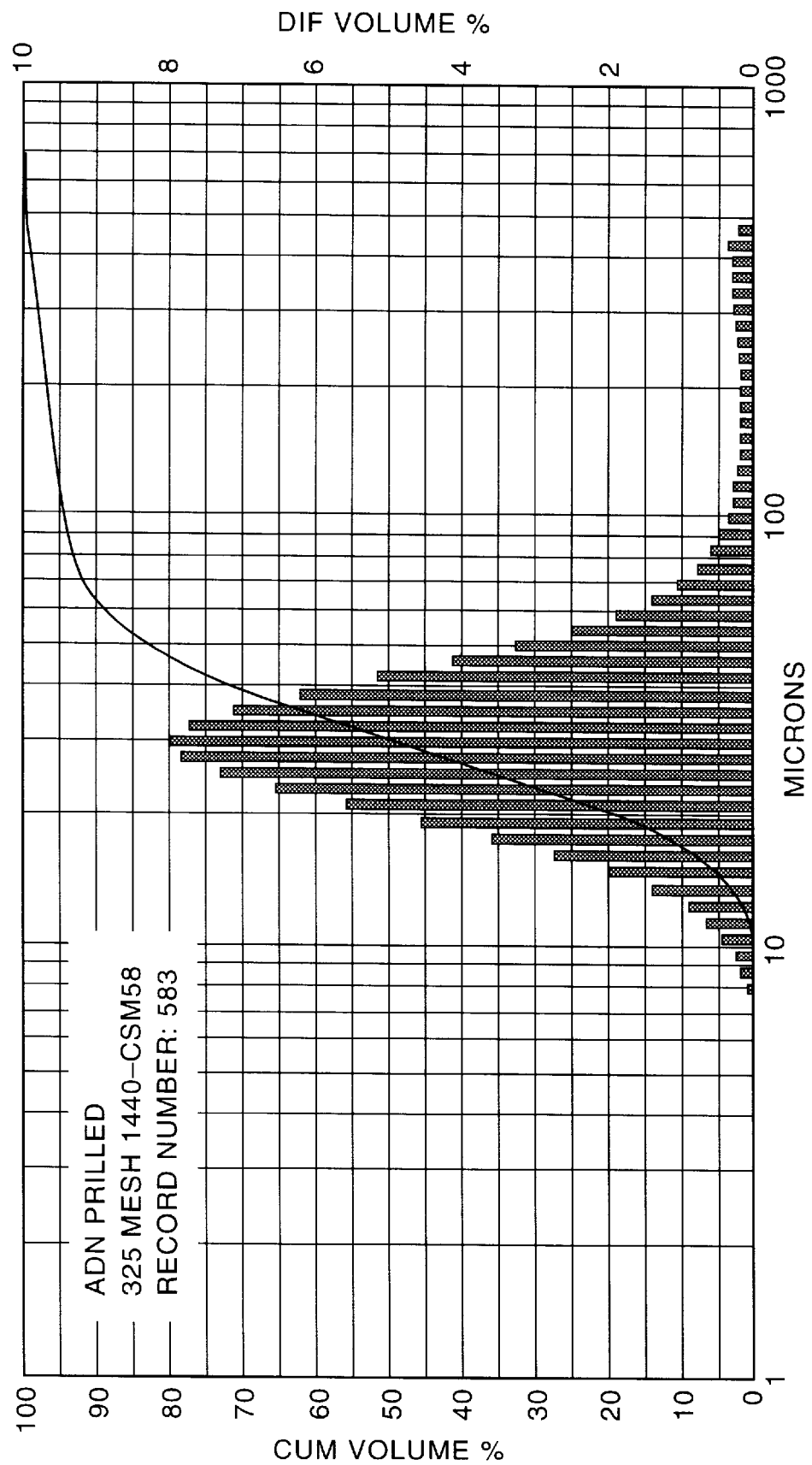
FIG. 11 shows the particle size distribution after prilling according to Example 4.

The prilled ADN particles exiting the cold zone (cooling zone or a cooling section) are then collected in a prill collector as shown in FIGS. 2 and 5. By preference, the ADN prills do not impact a flat surface perpendicular to their gravity-directed prilling path. For instance, on a pilot plant scale, the prills can exit the prilling column, for example, via an arcuately shaped tube. This enables collection of ADN prills while reducing prill fracturing, avoiding particles rebounding back into the upward fluid flow, and avoiding excessive inter-prill collisions during the collection process. Inter-prill impacts can deform, fracture or coalesce particles, depending on the stage of the present process.

The prilled ADN product discharged at the lower portion of the prilling column can be further cooled and, if desired, screened. Prilled ADN or a screened-prilled ADN product can be used in other energetic applications, including those described elsewhere herein, as well as by those described in U.S. Pat. No. 5,292,387, the complete disclosure of which is incorporated herein by reference. The fines passing through the screen can be recycled.

The particle size distribution in the present prilled ADN products can be tailored. For instance, relatively tailored ballistic performance and mechanical properties of the prilled ADN are achievable with the present process because a narrow particle size distribution on a mono- or multi-modal basis is now available. Multi-modal particle sizes, including bi-modal particles with narrow particle size distributions, such as those in the range of about 30 μm to 40 μm and about 110 μm to about 200 μm, offer the further advantages of formulating a denser propellant. In general, packing as in a standard missile or a shuttle is bi-modal to enhance packing density. Spaces between larger particles can be filled with smaller ADN-prills.

The presently prepared ADN prills can have an apparent bulk density comparable to ADN crystals, and are less prone to fracture, thermally more robust, safer and less hydroscopic.

The prilled ADN may have a melting point in the range of 92–94° C., is not hydroscopic (in contrast to ADN produced by conventional means), may have low impact sensitivity, is spheroidally shape instead of the needles seen from conventional ADN process, and exhibits improved thermal decomposition properties as compared to conventionally produced ADN.

Card gap is proportional to shock pressure. Card gap tests indicate an unexpected significant increased safety margin for detonation with the products of the present process. This means an increase in pressure for detonation. FIG. 8 shows a mechanism for generating card gap test data. The importance of an increase in card gap is described in Rudolf Meyer, Explosives, Verlag Chemie, N.Y. (3d ed. 1987), the disclosure of which is incorporated herein by reference. The significant improvement is indicative of the particle quality, including being void-free or at least essentially void free and having few if any defects.

In principle, propellants formulated with the present prilled ADN particles are capable of out-performing, from the ballistics standpoint, comparably formulated propellant compositions containing ADN-particles which were obtained by conventional processes.

The present prilled ADN particles can be usefully employed in a variety of propellant compositions and with a variety of binder formulations. Non-energetic, energetic binders, or a combination thereof can be usefully employed in formulating the propellant compositions. Binder systems for propellant formulations include, among others, substituted oxetane polymers, nitramine polymers, polyethers, and polycaprolactones (any of which can be plasticized or non-plasticized.) Exemplary suitable binders include hydroxy-terminated polybutadiene (HTPB), poly(glycidyl nitrate) (PGN), poly (nitratomethylmethyl-oxetane) ("poly-NMMO"), glycidyl azide polymer ("GAP"), diethylene-glycoltriethyleneglycolnitraminodiacetic acid terpolymer ("9DT-NIDA), poly(bisazidomethyl-oxetane) ("poly-BAMO"), polyazidomethyl-methyl-oxetane ("poly-AMMO"), poly(nitraminomethylmethyloxetane) ("poly-NAMMO"), copoly-BAMO/NMMO, copoly-BAMO/AMMO, polybutadiene-acrylonitrile acrylic acid terpolymer ("PBAN"), nitrocellose and a mixture of any of these. These formulations will typically include a curative appropriate for the binder. For example, a polyisocyanete curing agent is typically used with polyglycidyl nitrate, polyoxetanes, polyglycidyl azide, hydroxy-terminated polybutadienes, and polyethers (polypropylene glycol and polyethylene glycol), whereas an epoxy curing agent is typically used with other binders such as PBAN. It is understood, however, that the present invention is not limited to these curing agents.

These ADN-binder combinations can be used as a propellant, although additional types of formulations based thereon, such as composite propellants, are also within the scope of the invention. For instance, composite formulations can additionally include a reactive metal or metalloid, such as aluminum, beryllium, boron, magnesium, zirconium, silicon or mixtures or alloys thereof and, optionally, further ingredients. Suitable composite formulations which can be adapted for use with the present ADN prills are disclosed in U.S. Pat. No. 5,498,303, the complete disclosure of which is incorporated herein by reference. For example, the composite formulations of the '303 patent can be adapted for the ADN prills through, for instance higher solids loading.

The present prilled ammonium dinitramide can be surface coated in a manner known to those skilled in the art.

In FIGS. 2–3, small numbers refer to units of measure (such as inches) to illustrate relative dimensions of an exemplary pilot plant scale ADN prilling apparatus. The relative dimensions can be used as a guide in constructing larger-scale equipment suitable for practicing the present inventions.

The following non-limiting examples serve to explain embodiments of the present invention in further detail.

EXAMPLES

In the Examples, ADN-prills were manufactured using an apparatus with a vertically arranged glass tube (a glass lined column can also be used) having an approximately 122 cm long heated section and an approximately 61 cm long cold section ("cold zone"). The tube had an internal cross-sectional diameter of approximately 5 cm. Heating and cooling coils were used to establish the respective sections in the prilling column. Remotely positioned circulators were used to circulate the heating or working media. A feed hopper was positioned at the top of the prilling column. A compressed air vibrator can be used to feed the ADN feedstock to the prilling column. An arcuately tapered prill collection guide was provided at the foot of the prilling column. The tube is shown in FIGS. 3 and 6, and may be otherwise referred to as a prilling column hereinbelow.

The purity of the prills was determined using ion chromatography. Samples were prepared using 115 milligrams diluted to 100 milligrams using deionized water. The solution was then injected into an ion chromatograph which had previously been calibrated using ADN standards. The ion chromatograph was also previously calibrated to quantify the amount of ammonium nitrate and ammonium nitrite. The data obtained were used to calculate the prill purities reported in the Examples.

The test procedures for hazards properties are described in B. Cragan, Hazards Properties of a Magnesium Neutralized Propellant, AIM Meeting Paper No. 91-28-60 (Apr. 27–May 1, 1991), the complete disclosure of which is incorporated herein by reference.

Example 1

An ADN-feedstock containing 0.5 wt. % Cab-0-Sil and 0.5% urea was introduced into the feed hopper and prilled using the above-described apparatus. The resultant ADN prills were less sensitive than the ADN feedstock. The prilled ADN product remained thermally robust after processing (DSC onset above 182° C.) which indicated the presence of available stabilizer. The ADN prills (spheredized material), had less than a 1% increase in nitrate concentration and no nitrite as determined by IC analysis.

The safety data for the feedstock and prilled ADN are summarized in Table 2.

TABLE 2

| TEST | FEED | PRILLED |
|---|---|---|
| *ABL impact (cm) | 3.5 | 6.9 |
| *ABL friction (lbs) | 420 @ 2 ft/sec | 560 @ 8 ft/sec |
| *TC impact (in.) | 14.6 | 21.8 |
| *TC friction (lbs) | 64 | 63 |
| *ESD unconfined, J. | >8 | >8 |
| *ESD confined, J | 2 | 8 |
| *SBAT isothermal @ 100° C. | Immediate reaction exotherm | No reaction 48 hrs. |

In Table 2, ABL refers to a modified Bureau of Mines test, TC represents a Thiokol test, and ESD refers to electrostatic discharge. The prilled ADN had an apparent density of 1.79 g/cc (liquid pycnometer) or 98% of the crystal density.

An inert gas was introduced into the prilling column via an inlet as shown in the Figures to create the upward countercurrent flow.

Example 2

50 grams of pure crystalline ammonium dinitramide ("ADN") was combined with 500 mg of a fumed silica (a Cab-O-Sil brand fumed silica) and 500 mg of urea (Aldrich Chemical Co.) in a v-shell blender. The combined ingredients were dry mixed for about 2 minutes. The resultant solids mixture was removed from the mixer and screened using a laboratory screen mesh (200 mesh). The screened mixture was then placed in the hopper of the prilling apparatus and the prilling process was thereafter practiced. The internal temperature of the hot zone in the prilling column (tower) was about 289° F. (143° C.) and the cold or cooling zone (section) of the prilling column was about −15° C. The solid particulate mixture was fed into the top of the prilling column at an adjusted rate of about 2.5 grams/minutes. The inert gas fluid media was introduced from the bottom of the prilling column as shown in the Figures. The gas flow rate was adjusted. The prilled ADN product was collected from the bottom of the prilling column and submitted for particle size analysis and ion chromatography. The purity before and after the process was determined by ion chromatography while the particle sizes were determined by Microtrax.

The purity of the prills was 96.71% ADN, 1.40% ammonium nitrate, and less than 0.2% ammonium nitrite.

Example 3

The procedure of Example 2 is followed except that the mesh in the screening step is 250 mesh.

The purity of the prills was 96.78% ADN, about 1.06% ammonium nitrate, and less than 0.2% ammonium nitrite.

Example 4

The procedure of Example 2 is followed except that the mesh is 300 mesh.

The purity of the prills was 96.71% ADN, 1.4%, ammonium nitrate, and less than 0.2% ammonium nitrite.

What we claim is:

1. A process for producing prills comprised of ammonium dinitramide (ADN) said process comprising:
   providing a solid particulate ADN feedstock;
   providing a prilling column, said prilling column having at least one heated zone, and at least one cooling zone;
   introducing said ADN feedstock into said prilling column and allowing it to fall through the heated zone to form melted particular particles, pre-prills;
   providing a flow of an inert fluid medium into said prilling column whereby the flow of said fluid medium is countercurrent to the flow path of said ADN pre-prills, said countercurrent flow being-sufficient for spheridization, while avoiding excessive turbulence within the prilling column;
   allowing said ADN pre-prills to fall through said cooling zone and be spheridized in said prilling column;
   allowing said spheridized ADN to pass through the cooling zone in said prilling column, said cooling zone being at a temperature sufficient to harden said spheridized ADN particles into prills while avoiding excessive condensation, said temperature being below the melting point of ADN;
   and collecting the thus formed ADN prills.

2. The process according to claim 1, wherein said ADN feedstock contains at least one thermal stabilizer comprising a nitrogen-containing stabilizer.

3. The process according to claim 2, wherein said organic nitrogen-stabilizer comprises urea, a mono-hydrocarbon urea derivative, a poly-hydrocarbon urea derivative, or a mixture of any thereof.

4. The process according to claim 2, wherein the hydrocarbon group in said monohydrocarbon urea derivative contains 1 to 10 carbon atoms.

5. The process according to claim 2, wherein the hydrocarbon group in said poly-hydrocarbon urea derivative contains 1 to 10 carbon atoms.

6. The process according to claim 2, wherein said thermal stabilizer comprises one or more of 1,1-dialkylurea, 1,3-dialkyl urea N,N'-dialkyl urea or N,N'-diphenyl urea.

7. The process according to claim 2, wherein said feedstock contains about 0.1% to about 5% of weight of said thermal stabilizer.

8. The process according to claim 7, wherein said feedstock contains 0.25% to 2% by weight of said thermal stabilizer.

9. The process according to claim 1, wherein said ADN feedstock further comprises a processing aid.

10. The process according to claim 1, wherein said solid particulate ADN feedstock is at a temperature less than about 40° C.

11. The process according to claim 1, wherein the temperature in the heated zone is from 90° C. to 150° C.

12. The process according to claim 11, wherein the temperature in the heated zone is 100° C. to 130° C.

13. The process according to claim 1, wherein said cooling zone, the temperature is up to about 40° C.

14. The process according to claim 13, wherein the temperature in the cooling zone is up to about 25° C.

15. The process according to claim 2, wherein said ADN feedstock further comprises a processing aid.

16. The process according claim 15, wherein said organic nitrogen-stabilizer comprises urea, a mono-hydrocarbon urea derivative, a poly-hydrocarbon urea derivative, or a mixture of any thereof.

* * * * *